Patented Nov. 30, 1926.

1,609,174

UNITED STATES PATENT OFFICE.

WILLIAM WALTER LEAKE, OF NEW ORLEANS, LOUISIANA.

SIZING COMPOSITION.

No Drawing. Application filed May 19, 1925. Serial No. 31,447.

This invention relates to a sizing composition.

An object of the invention is to provide a simple and efficient economically manufactured composition in the form of a size which can be applied to plastered walls in new buildings almost immediately after the plaster has been put on, thus avoiding the necessity to have to wait two or three weeks for the plaster to dry.

I have found that by properly combining three simple ingredients within certain approximate proportions, I produce a size which is capable of being applied to the plaster almost immediately as soon as the plaster has been applied to the walls, and that paint put on over this size will not peel off even after several years' standing.

The three ingredients which I use are as follows:

(1) Pitch
(2) Spirits of turpentine
(3) Linseed oil.

The pitch is a hydrocarbon, a by-product in the manufacture of turpentine,—the exact chemical formula of which, however, cannot be given. The spirits of turpentine is of the formula—$C_{10}H_{16}$. The linseed oil is a hydrocarbon, the principal ingredient of which is linolin, which on exposure becomes linoxyn—$C_{32}H_{54}O_{11}$.

The size is generally made by heating the pitch gently until it becomes a liquid, and then adding the turpentine. After a few minutes' stirring, this is mixed with the previously boiled linseed oil. Preferably nine pounds of pitch are melted and mixed with one-half gallon of turpentine.

The approximate proportions of the pitch-turpentine mixture to the linseed oil may vary from 80 to 60 per cent of the former, to 20 to 40 per cent of the latter, in accordance with the amount of moisture in the walls on which this composition is to be placed.

The mixture is allowed to stand for several hours after which time it may be placed in sealed cans ready for use.

What the size does:

1. It absolutely prevents paint from peeling from plastered walls. The size forms a binder between the wall and paint, does not become brittle, and, therefore, the paint never peels from the wall. The pores of the wall are closed and there is no longer suction. One gallon of size covers 650 square feet of wall space. Paint will cover 450 square feet to 600 square feet over ordinary size. This size will increase the covering capacity of paints approximately 100 square feet.

2. The size will neutralize the alkaline wall, so where an excess of lime is present, there will be no burning through on to the paint. Experiments show that the size placed on whitewash will cause no burning through of the whitewash.

3. The size can be applied to newly plastered walls within forty-eight hours, thereby making it possible to paint the walls much sooner. Over other sizes it is usually necessary to wait two or three weeks or longer. It is not water proof, but it does prevent dampness from coming through. In new walls the size can be placed over the brown coat and then over the skin coat, if there is fear of any moisture coming through.

Walls where paint would peel in two weeks have had paint for longer than a year and a half or more with no sign of peeling, by previously using this size. All new walls not sized with this preparation have been unsatisfactory.

In placing the size on the wall, it should not lap. The size should not be placed on walls already painted, for the old paint will bind to the new and both the old and new may peel.

What is claimed is:

1. A sizing composition for plaster walls, which consists of a mixture of pitch and turpentine, which varies from 80 to 60 per cent, combined with linseed oil, which varies from 20 to 40 per cent of the composition.

2. A sizing composition for plaster walls, which consists of a mixture of one gallon of pitch to a half-gallon of turpentine, this mixture being combined in proportions ranging from 80 to 60 per cent, with linseed oil in porportions ranging from 20 to 40 per cent.

WILLIAM WALTER LEAKE.